July 5, 1932. H. D. GEYER 1,865,464
MULTIPLE HYDRAULIC PRESS FOR MOLDING INLITE BATTERY BOXES
Filed Aug. 2, 1927 4 Sheets-Sheet 1

Inventor
Harvey D. Geyer
By Spencer Hardman & Fehr
his Attorneys

July 5, 1932. H. D. GEYER 1,865,464
MULTIPLE HYDRAULIC PRESS FOR MOLDING INLITE BATTERY BOXES
Filed Aug. 2, 1927 4 Sheets-Sheet 3

Inventor
Harvey D. Geyer
By Spencer Hardman & Fehr
his Attorneys

July 5, 1932.  H. D. GEYER  1,865,464

MULTIPLE HYDRAULIC PRESS FOR MOLDING INLITE BATTERY BOXES

Filed Aug. 2, 1927   4 Sheets-Sheet 4

Inventor
Harvey D. Geyer
By Spencer Hardman & Fehr
his Attorneys

Patented July 5, 1932

1,865,464

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

MULTIPLE HYDRAULIC PRESS FOR MOLDING INLITE BATTERY BOXES

Application filed August 2, 1927. Serial No. 210,183.

This invention relates to molding machines for molding articles from a relatively stiff plastic compound, especially a hot stiff compound of bituminous material, fibrous material and a filler material.

In my copending application, Serial No. 210,182, filed August 2, 1927, there is described and claimed a means and method of molding articles from such a compound by extruding the compound through a small outlet into the mold cavity and then maintaining high internal pressure upon the material in the mold cavity until the same sets and hardens, after which the mold is divided and the article removed therefrom by breaking off the small neck formed in the extrusion outlet leading to the mold cavity.

An object of this invention is to provide a molding machine for molding a plurality of articles at one time and using a common pressure cylinder for extruding the plastic material into the plurality of mold cavities. A great advantage in this, besides that of economy in time and labor in making a plurality of articles at one operation, is that a relatively large batch of the hot plastic material is removed from the kneading machine at one time and hence such batch will retain its heat better and will have less exposed surface for the formation of a sort of hardened skin thereon during the transfer of the batch of material from the kneading machine to the molding machine. Another advantage of this invention is that there will be only one small flash portion of the material, remaining in the pressure cylinder, for a plurality of molded articles, and hence there will be less waste of material.

Another object of this invention is to provide a molding machine having the pressure cylinder head removable with the separation of the mold sections, whereby the flash portion remaining within the pressure cylinder is easily removable therefrom.

Another feature of the invention is the use of the pressure ram to separate the part comprising the cylinder head and one section of the mold from another section of the mold after the molding operation is completed.

Another feature is the division of the mold sections along a plane extending through the extrusion outlets leading from the pressure cylinder to the mold cavities, whereby the hardened material within these extrusion outlets is easily removed.

Another feature of the invention is the lower hydraulic platen for maintaining the mold sections pressed together with high pressure during the molding operation, and permitting the quick and easy separation of the mold sections for the removal of the molded articles. Also the central cores for the battery boxes are all attached to and movable with this lower platen, and are by it pulled from the molded boxes after the mold sections are separated.

Further objects and advantages of the present invention will be apparent from the following description, reference being had to the accompanying drawings, wherein a preferred embodiment of one form of the present invention is clearly shown.

In the drawings.

Similar reference characters refer to similar parts throughout the several views of the drawings.

Figure 1:
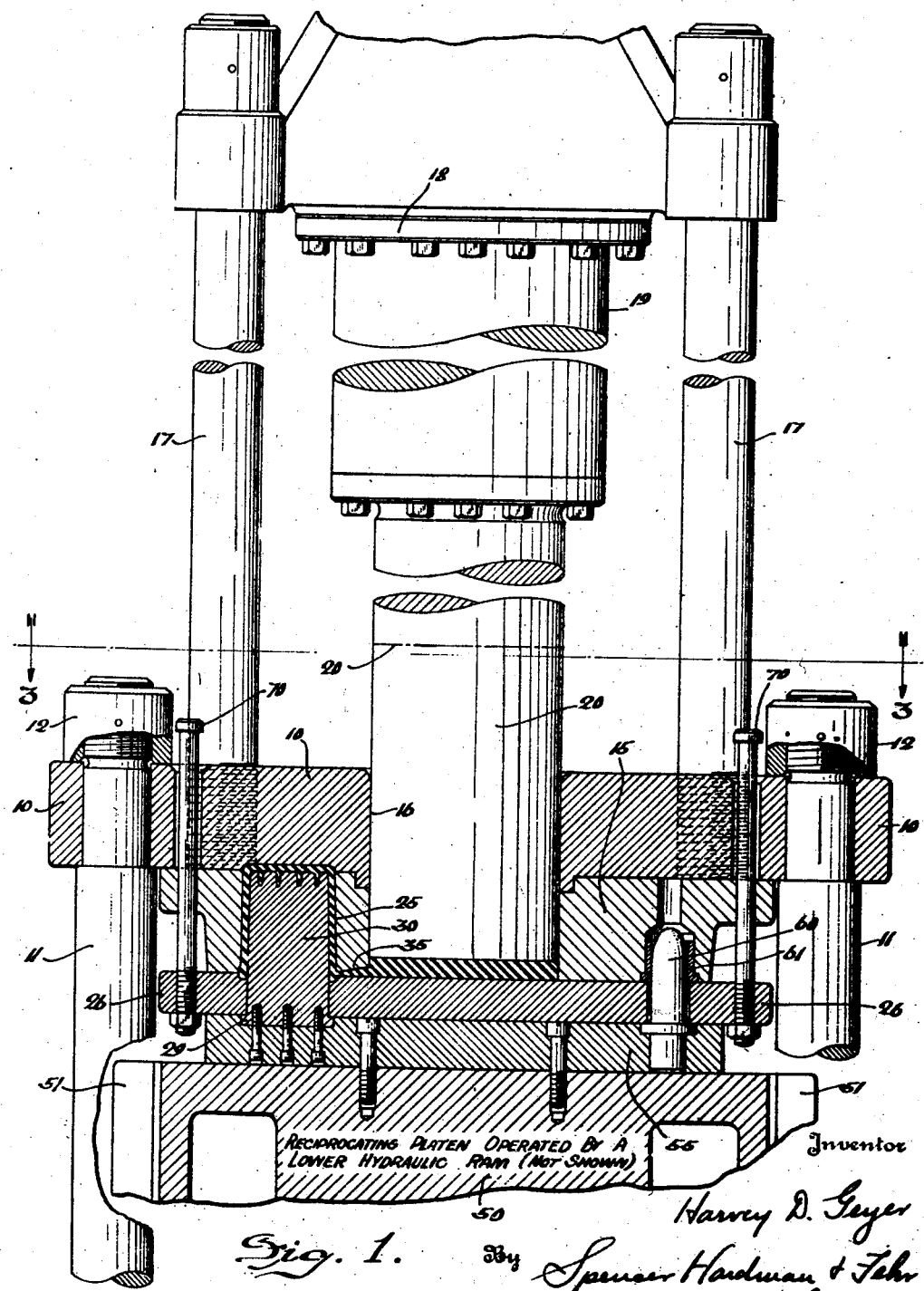
Fig. 1 illustrates certain portions of a hydraulic molding machine built according to the principles of this invention for molding five battery boxes at one operation. The view is a vertical section through the center line of the mold parts and is taken on line 1—1 of Fig. 3, and shows all the parts in the position occupied during the hardening of the plastic material.

Numeral 10 indicates the main or stationary platen of a large hydraulic press and is held fixed in position by the four large tie rods 11 and the nuts 12 thereon. This stationary platen 10 has a form plate 15 rigidly fixed to its under side by any suitable means such as the screws 13. The two plates 10 and 15 are bored out on the center line of the press, providing a central cylinder 16, which will hereinafter be termed the pressure cylinder since the plastic material is put under high pressure by means of this cylinder and its ram.

Four tie rods 17 are rigidly secured to the stationary platen 10, such as by being threaded thereinto as shown in Fig. 1, and support at their upper ends a hydraulic cylinder 18 (shown only partially in Figs. 1 and 2) which is aligned with the pressure cylinder 16 therebelow. This hydraulic cylinder 18 has a hydraulic piston or ram 19, and bolted to the lower end of piston 19 is the relatively long pressure ram 20 which is adapted to be projected down into and through cylinder 16 by means of the hydraulic cylinder and piston 18 and 19. The diameter of cylinder 18 being larger than that of cylinder 16, the pressure exerted by ram 20 upon the plastic material in cylinder 16 is greater than the hydraulic pressure within cylinder 18 according to the inverse ratio of the respective areas of said cylinders.

Figure 2:
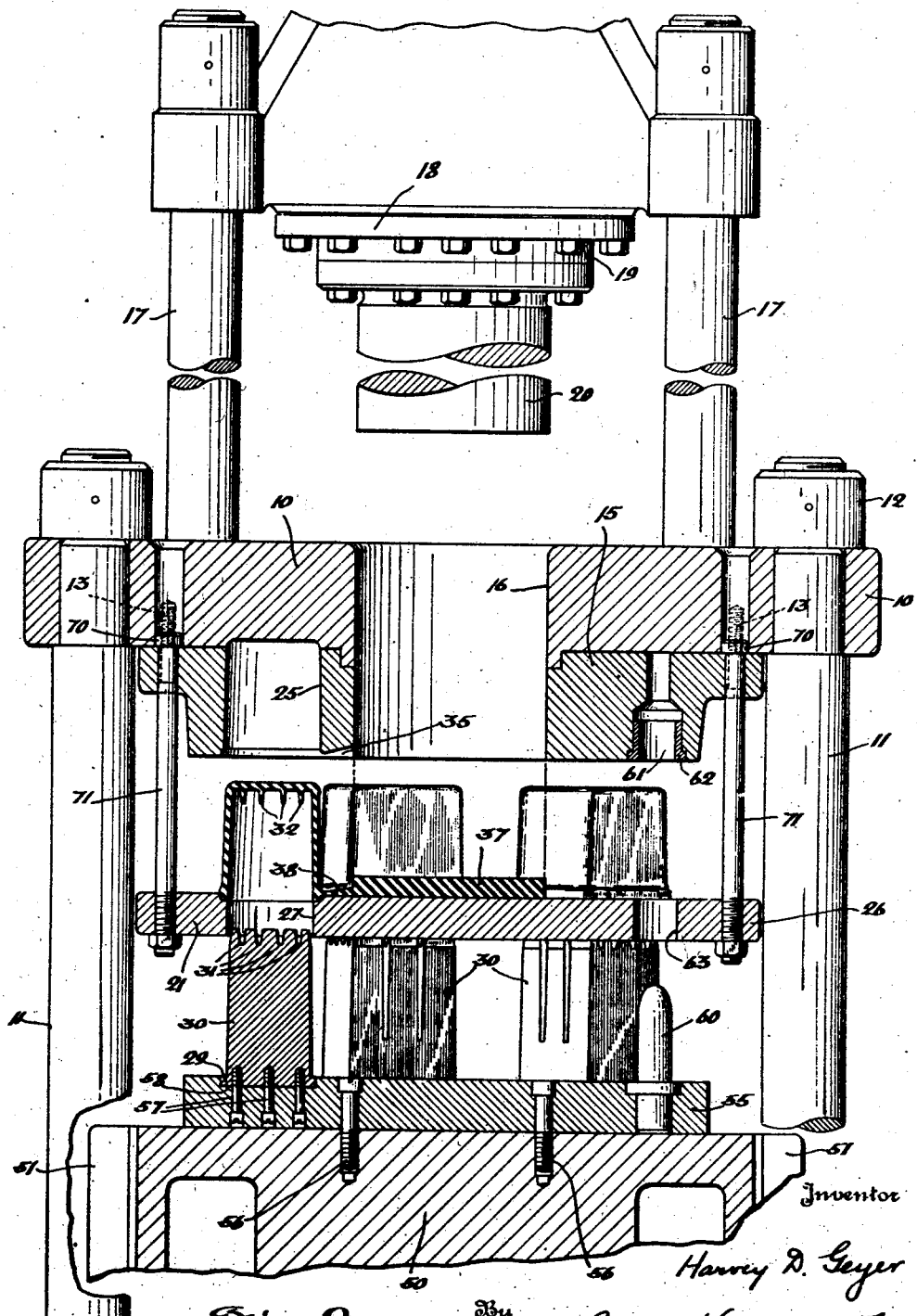
Fig. 2 is a view similar to Fig. 1, but shows the position of the parts after the mold sections are separated and the cores withdrawn from the molded battery boxes by the downward movement of the lower platen. The pressure ram is also shown moved up to its "up" position, the tie rods and pressure ram being shown with a section broken out to represent that their full vertical heights are not shown.
Figure 3:
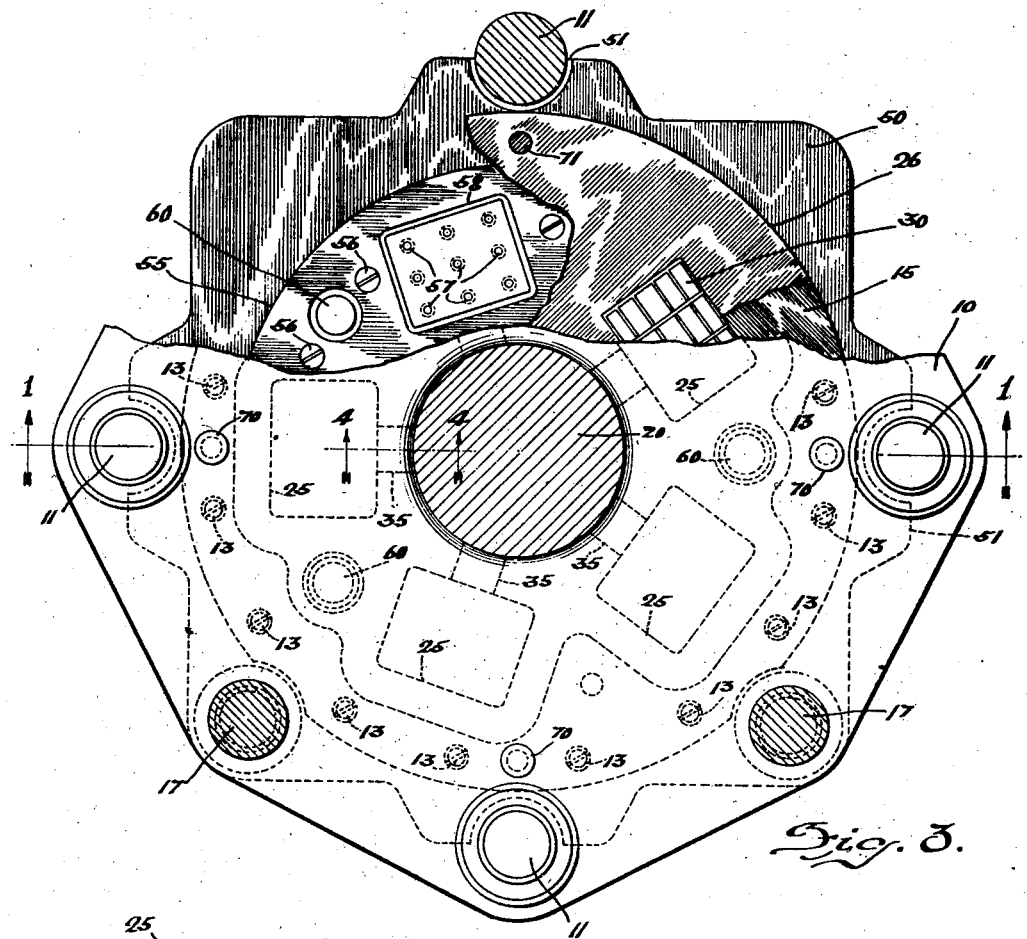
Fig. 3 is a plan view below line 3—3 of Fig. 1, certain portions being broken away to more clearly disclose the parts thereEneath.
Figure 5:
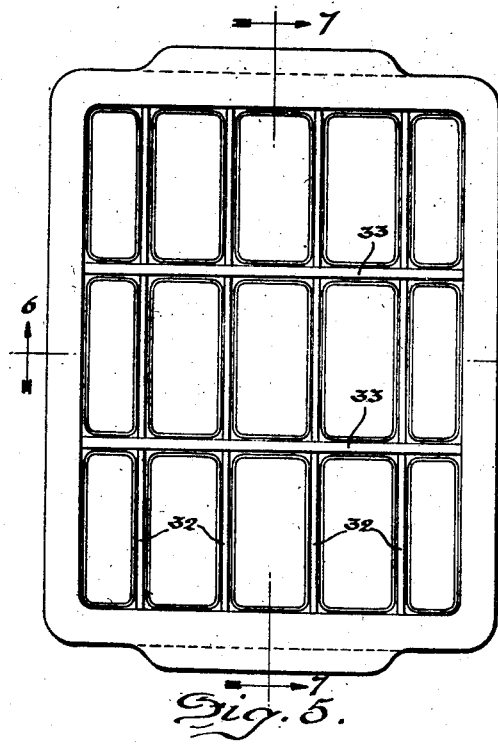
Fig. 5 is a plan view on an enlarged scale of one of the battery boxes shown in section within the mold in Figs. 1 and 2.
Figure 6:
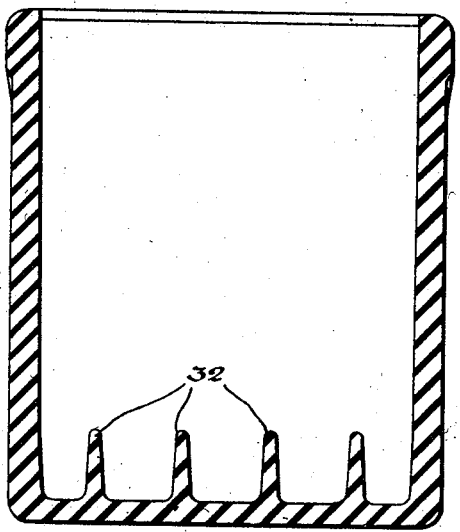
Fig. 6 is a transverse section through the battery box taken on line 6—6 of Fig. 5.
Figure 7:
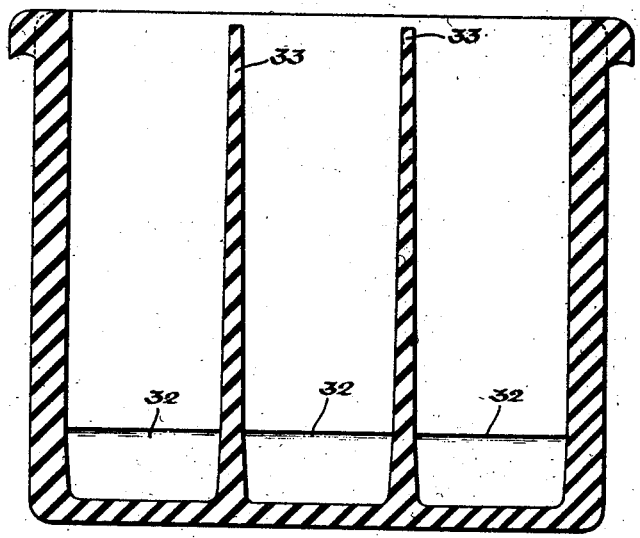
Fig. 7 is a longitudinal section taken on line 7—7 of Fig. 5.

Equiangularly spaced radially about the cylinder 16 are the mold cavities 25, formed largely within the form plate 15 but partly within the plate 10, as clearly shown in Fig. 2. These cavities 25 of course correspond to the outside dimensions of the molded boxes. The lower removable plate 26 has a small portion of the mold cavities 25 formed therein and thus this plate 26 comprises the lower mold section for the five mold cavities 25. This plate 26 has apertures 27 therein through which project the removable cores 30 which are properly located within the cavities 25 when their flanges 29 abut the bottom surface of plate 26 (see Fig. 1). These cores 30 are properly grooved, as at 31, to form the desired short webs 32 and the tapered division walls 33 of the battery boxes (see Figs. 5, 6 and 7).

Figure 4:
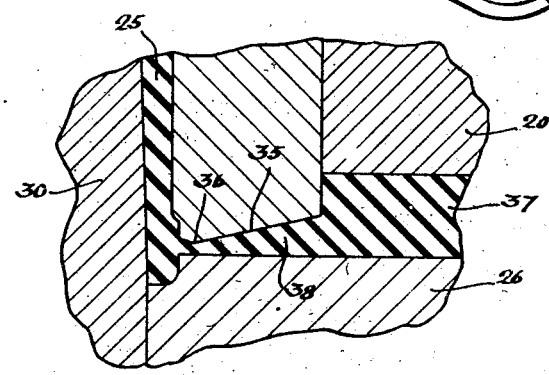
Fig. 4 is an enlarged vertical section through the extrusion outlet leading from the pressure cylinder into one of the mold cavities, and is taken on line 4—4 of Fig. 3.

The relatively short flat grooves 35 cut in the form plate 15 interconnect each of the mold cavities 25 with the lower end of the cylinder 16, so that when plate 26 is in the cavity closing position shown in Fig. 1 these grooves 35 form restricted passages leading from the cylinder 16 to said mold cavities. These passages 35 will hereinafter be termed extrusion outlets since the plastic material is compressed in the cylinder 16 by the ram 20 and extruded under high pressure through these outlets 35 into each of the mold cavities 25 during the molding operation. Fig. 4 is an enlarged view of one of these extrusion outlets 35. Preferably these outlets 35 are tapered as shown and have their most restricted portion 36 slightly spaced from the wall of the battery box, as shown in Fig. 4, so that when the molded boxes are all removed from the mold still attached to the flash portion 37 by the necks 38, which are formed by the plastic material hardening within the cylinder 16 and extrusion outlets 35 respectively, these necks 38 are easily broken off at the point 36. The short projection remaining attached to the battery box may then be easily cut or ground off and the surface smoothed over by a hot iron if desired. The shape and dimensions of the extrusion outlets 35 at the point 36 depends somewhat upon the shape of the molded article and the point thereon which connects with the extrusion outlet, the volume of plastic material required to form the molded article, and the plasticity and ingredients of the plastic material being used. In molding the battery boxes illustrated in the drawings from the bituminous plastic material described and claimed in my copending application, Serial No. 169,669, filed Feb. 19th, 1927, I have obtained very good results with an extrusion outlet two inches wide and one-eighth inch deep at the most restricted point.

Proceeding with the description of the molding machine, 50 designates a lower platen guided in its vertical movement by guides 51 upon the tie rods 11. This platen 50 is mounted upon and moved by a lower large hydraulic ram and cylinder (not shown) but which may be of any well known type and hence its illustration and further description is not deemed necessary in describing the invention of this application. A locating plate 55 is rigidly fixed to the top surface of platen 50 by screws 56. This plate 55 also carries the cores 30 which are rigidly fixed thereto by the screws 57 and the recesses 58 within which the base of the cores 30 fit snugly as clearly shown. This locating plate 55 has two upstanding locating pins 60 rigidly fixed thereto. The form plate 15 is provided with locating holes 61 having bushings 62 perfectly aligned with the pins 60. The plate 26, which will hereinafter be termed the stripper plate, has holes 63 of slightly greater diameter than pins 60 to permit said pins 60 to pass therethrough and enter the locating holes 61 in the form plate 15 when the lower platen 50 is raised to its "up" position, as shown in Fig. 1. The stripper plate 26 is located in its proper position by the fit of the cores 30 in the holes 27 of plate 26 when the parts are in the position shown in Fig. 1. It is thus seen that all the parts of the mold are positively located in their proper positions relative to one another.

The operation of the molding press is as follows: Beginning with the parts in the positions shown in Fig. 1, but with the pressure ram 20 raised to its "up" position so that its bottom surface is at the line 20' in Fig. 1, a sufficient amount of the hot plastic material to form all five battery boxes and have an excess left over in the pressure cylinder 16 is transferred from the kneading machine to the cylinder 16. Preferably this charge of the hot plastic material is in one large hunk and it is simply dropped into the cylinder 16 when the ram 20 is raised sufficiently to easily permit this. The ram 20 is next caused to descend into cylinder 16 by controlling the hydraulic cylinder 18 in any well known manner. The charge of plastic material is highly compressed within cylinder 16 and caused to flow through the five extrusion outlets 35 into the five mold cavities 25 until said cavities 25 are completely filled. This extrusion of the plastic material thoroughly mixes and heats the material just prior to its entering the mold cavity with the result that the asbestos or other fibers in the material are thoroughly coated over with the binder and the resultant molded article is better formed, more homogeneous and stronger and has a very smooth and neat looking surface as it comes from the mold. After the five cavities 25 are filled with the plastic material, the excess material of the charge remains in cylinder 16 and by this means the high pressure of the ram 20 is transmitted to the plastic material in the five cavities 25. In other words, as soon as the cavities 25 become completely filled, the internal pressure in the material immediately builds up to that within the excess material 37 remaining in cylinder 16 due to the fact that the material is sufficiently plastic to act as a liquid under pressure. The internal pressure in the plastic material preferably ranges from 4,000 lbs. to 10,000 lbs. per square inch, the higher the pressure the stronger and smoother are the molded articles obtained and the less time required for remaining in the mold to produce a good article.

The high internal pressure within the material in the cavities 25 causes it to harden substantially immediately, but for the best results it has been found preferable to permit the articles to remain in the molds under pressure several minutes, for example, from three to five minutes.

During the molding operation the plate 26, which in fact forms the lower mold section, and the cores 30 are held pressed up against the bottom surface of the form plate 15 by the lower platen 50 which is forced upward by the lower hydraulic cylinder (not shown) with a force greater than the total down force on the five cores 30 and the plate 26 due to the internal pressure in the plastic material.

When it is desired to remove the molded articles from the molds, the up force on the platen 50 is released, whereupon the ram 20, acting upon the hardened flash portion 37 remaining in the cylinder 16, will force the plate 26 together with the cores 30, plate 55 and platen 50 downward. The molded boxes have a tendency to shrink tightly upon their cores 30 and hence the five molded boxes will be pulled from the recesses 25 in the form plate 15 while yet attached to the flash portion 37 by the five necks 38, which also are pulled from their recesses 35 by the down movement of the flash portion 37 and the five boxes. The ram 20 moves the stripper plate 26 down approximately to its position shown in Fig. 2, where said stripper plates down movement is halted by the engagement of the heads 70 of four support rods 71 with the top surface of form plate 15.

Next the platen 50 is pulled down by the lower hydraulic cylinder (not shown), thus pulling the five cores 30 out of the molded boxes, the boxes of course being held up by the stripper plate 26. Fig. 2 illustrates the down position of the cores 30, while the five boxes remain sitting upon the stripper plate 26 and still attached to the flash portion 37 by the necks 38. The boxes and flash portion may now be removed laterally from plate 26 as a unit, after which the separate boxes are cut or broken off at the narrowest portion of the necks 38.

For the next molding operation, the platen 50 is moved by the lower hydraulic cylinder. As it moves up the cores 30 pass through the holes 27 and the pins 60 pass through the holes 63 until the top surface of plate 55 engages the bottom surface of plate 26, after which plate 26 is carried along up until it abuts the bottom surface of the form plate 15, the locating pins 60 in the meantime entering the locating holes 61. The parts will then be in the position shown in Fig. 1, except of course the pressure ram 20 will be at its top position and there will be no plastic material within cylinder 16 or the mold cavities 25. The molds are then ready to receive the next hot charge of plastic material.

It is thus seen that this device is capable of rapidly producing moulded articles according to the extrusion method described in my above mentioned copending application, Serial No. 210,182, filed August 2, 1927.

While the form of embodiment of the present invention as herein disclosed, constitutes a preferred form, it is to be understood that

What is claimed is as follows:

1. A molding machine for molding articles from a stiff plastic material comprising: a pressure cylinder for receiving the unformed plastic material, a ram for said cylinder, a mold having a plurality of mold cavities spaced adjacent the outside of said cylinder and individually connected to the cylinder interior by a plurality of relatively small extrusion apertures, said apertures being adjacent the cylinder head, said mold having a stationary upper section and a reciprocable lower section dividing through said apertures said lower mold section and cylinder head being functionally integral and reciprocable together, a movable platen for supporting said lower section during the molding operation, said ram being operable to press the movable lower mold section from the stationary upper section after the completion of the molding operation and thereby initiate the separation of the mold sections.

2. A molding machine for molding articles from a stiff plastic material comprising: a pressure cylinder for receiving an unshaped mass of plastic material having an open end, a pressure ram for said cylinder, a mold comprising a relatively stationary and a reciprocable section and having a plurality of mold cavities adjacent the outside of said cylinder and individually connected to the cylinder interior through relatively small extrusion apertures, said movable section forming the head for said cylinder and one wall for each of said mold cavities and one wall for each of said extrusion apertures, and a reciprocable platen for supporting said movable section during the molding operation, said movable section being adapted to be forced out of its cavity closing position by a subsequent travel of said ram after the plastic material has hardened in said mold cavities, whereby the mold sections are separated.

3. A molding machine for molding and hardening articles under high pressure from a plastic material comprising: a stationary pressure cylinder for receiving the plastic material, a stationary mold section having a mold cavity adjacent said pressure cylinder and connected thereto through an outlet, a complementary mold section for said mold cavity reciprocable to a position to close the mold cavity and the end of the pressure cylinder, a high pressure ram for said cylinder adapted to force the plastic material through said outlet into said mold cavity and to maintain high internal pressure thereupon until said material hardens, said ram being operable to perform a subsequent additional travel whereby the reciprocatable mold section is forced away from said first stationary section.

4. A molding machine for molding and hardening articles under high pressure from a plastic material comprising: a stationary pressure cylinder for receiving the plastic material, a stationary mold section having a mold cavity adjacent said pressure cylinder and connected thereto through an outlet, a reciprocable complementary mold section for said mold cavity, a reciprocable mold core projecting though said complementary section into said mold cavity and having a portion underlying said complementary section whereby said core can be forced outwardly from said cavity by said complementary section, a high pressure ram for said cylinder adapted to force the plastic material into said mold cavity thru said outlet and to maintain it under high internal pressure until it hardens, said complementary section having a portion in the path of movement of said ram, said ram being operable to perform a further travel after said material hardens to initiate the separation of said mold core and complementary section from said stationary mold section.

5. A molding machine for molding and hardening articles under high pressure from a plastic material comprising: a pressure cylinder for receiving the plastic material, a stationary mold section having a mold cavity adjacent said pressure cylinder and connected thereto through an outlet, a reciprocable complementary mold section for said mold cavity, a reciprocable mold core projecting through said complementary section into said mold cavity and having a portion underlying said complementary section whereby said core can be forced outwardly from said cavity by said complementary section, a high pressure ram for said cylinder adapted to force the plastic material into said mold cavity thru said outlet and to maintain it under high internal pressure until it hardens, said complementary section having a portion in the path of movement of said ram, said ram being operable to perform a further travel after said material hardens to start forcing said mold core and complementary section from said stationary mold section, and means for subsequently withdrawing said mold core from said complementary section whereby to strip the molded article from said core.

6. A molding machine for molding and hardening articles under high pressure from a plastic material comprising: a pressure cylinder for receiving the plastic material, a high pressure ram for said cylinder, a stationary mold section having a mold cavity therein connected to said cylinder thru an outlet, a reciprocable mold core projecting into said mold cavity and underlying a movable mold section in the path of movement of said ram, means for supporting the mold core during the molding operation, power means for causing said ram to force the plastic material into said cavity thru said outlet under high internal pressure until it hardens, said power means being operable for then causing a further travel of said ram to start forcing said movable mold section and said mold core from said mold cavity by acting upon said mold section in its path.

In testimony whereof I hereto affix my signature.

HARVEY D. GEYER.